No. 617,842. Patented Jan. 17, 1899.
H. A. WAGNER.
METHOD OF AND MEANS FOR DERIVING POLYPHASE CURRENTS.
(Application filed Nov. 13, 1896.)
(No Model.)
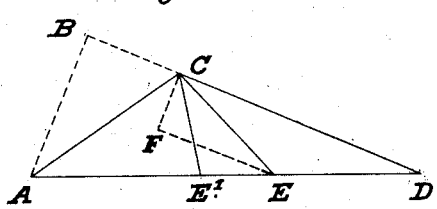
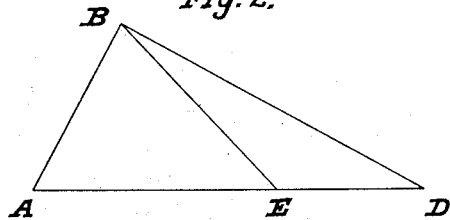
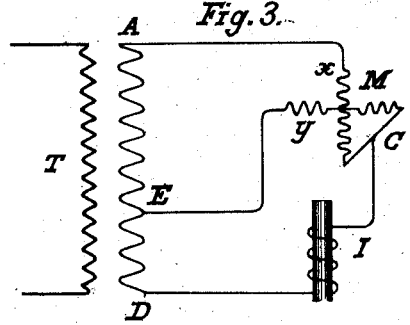
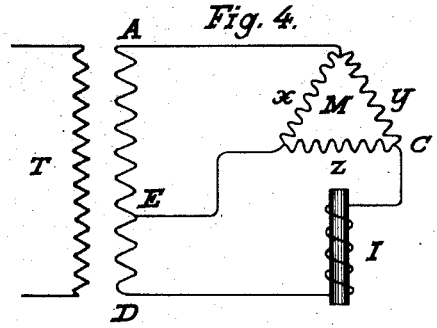
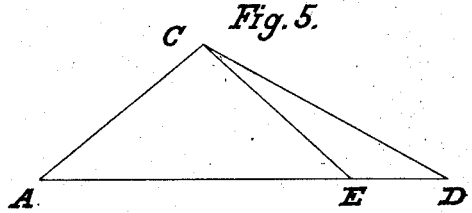
Witnesses
Willis Fowler
Samuel M. Chesnut
Inventor
H. A. Wagner
By his Attorneys
Fowler & Fowler

UNITED STATES PATENT OFFICE.

HERBERT A. WAGNER, OF ST. LOUIS, MISSOURI.

METHOD OF AND MEANS FOR DERIVING POLYPHASE CURRENTS.

SPECIFICATION forming part of Letters Patent No. 617,842, dated January 17, 1899.

Application filed November 13, 1896. Serial No. 611,969. (No model.)

*To all whom it may concern:*

Be it known that I, HERBERT A. WAGNER, a citizen of the United States, residing in the city of St. Louis, in the State of Missouri, have invented a certain new and useful Method of and Means for Deriving Polyphase Currents of Electricity, of which the following is such a full, clear, and exact description as will enable any one skilled in the art to which it appertains to make and use the same, reference being had to the accompanying drawings, forming part of this specification.

This invention relates to a method of and means for deriving two or more alternating currents differing from one another in phase from a source of electricity supplying alternating currents of single phase.

It is well known that in circuits containing self-induction the current lags behind the electromotive force by a certain angle depending upon the relative ohmic and inductive resistances. The current flowing in such a circuit may be considered as due to the resultant of two electromotive forces, one being that which would be sufficient to cause the same flow of current through the ohmic resistance and the other that which would be required to overcome the electromotive force of self-induction or the inductance. These two electromotive forces always differ in phase by an angle of ninety degrees, and with their resultant may be conveniently represented graphically by the three sides of a right-angled triangle.

Slight differences of phase have been heretofore produced between two circuits derived from the same single-phase source by introducing self-induction into one of them and non-inductive resistance into the other. Only slight phase differences are obtainable in this way, however, it being impossible to even approximate or approach a difference as great as ninety degrees, as this would require an infinite electromotive force and an infinite inductive resistance. To produce phase differences in this way which could be effectively applied for any purpose, such as starting or operating alternating-current motors, very much higher electromotive forces must be obtained than are required on the working circuits and these electromotive forces then cut down by the necessary ohmic and inductive resistances, resulting in a large loss of energy and an unwarrantable increase in the capacity of generators, lines, and transformers.

As all alternating-current motors have a large self-inductive element in their coils, if the method just described is used in connection with such motors a still smaller phase-angle can be secured, the self-contained inductance counteracting in part the effect of that extraneously applied. I have found that any number of circuits differing by almost any desired amount in phase may be derived from two circuits differing slightly in phase or made to differ by such ordinary means described by connecting the required circuits between suitable points in the two given circuits and that this may be accomplished with practically no loss of energy.

In the accompanying drawings, Figures 1, 2, and 5 are diagrams serving to illustrate graphically the principle of my invention. Figs. 3 and 4 illustrate the manner of operating two and three phase motors, respectively, by means of my invention.

In Fig. 1, A D represents in direction and amount the electromotive force of a source of current, such as the secondary of a transformer, C D the electromotive force across the terminals of an inductance-coil, forming a derived circuit differing in phase from the electromotive force A D by the angle A D C, and A C the resultant electromotive force across the terminals of a working circuit derived from the source A D and made to differ from it by the angle C A D through the effect of the inductance C D. The greatest angle of phase difference which could be obtained by methods heretofore known may be represented by the angle C A D between the circuits A C and A D. If another circuit is connected from the point C to some point E on A D, an angle A C E is formed with the circuit A C. This angle represents the difference of phase between the derived circuits A C and C E. The point E may be moved in either direction along A D to any other position, as E', and the phase relation of C E, as well as its relative electromotive, force be altered as desired.

It is evident that any number of circuits may be connected to as many different points in this way, forming angles of phase difference A C E, A C E', &c., with A C, and the angles C E A, C E' A, &c., with A D. The electromotive force A C is represented as that which would occur across the terminals of a circuit containing some self-induction, such as the coils of an alternating-current motor, in which B C is the electromotive force of self-induction and A B the electromotive force required to send the given current through the ohmic resistance of the wire and against the counter electromotive force caused by the rotation of the motor. A B, the non-inductive element of the circuit, will always be at right angles to the inductance C D.

The use of the same lines to represent both the resultant electromotive forces of working circuits and also the circuits themselves need not lead to confusion to one practiced in the art and accustomed to representing electrical phenomena graphically. As the currents in phase and amount in circuits of similar inductance or self-induction are determined by the electromotive forces across the terminals of such circuits, we can simplify the representation of the phase differences of such circuits by showing simply the electromotive forces.

The line C E represents an electromotive force across the terminals of a second working circuit, such as another set of coils of a polyphase motor. Its magnitude and phase are determined by the relative magnitudes and phases of the electromotive forces A C, C D, and A E, the point C being fixed by the relation of the electromotive forces A C, C D, and A D. The new electromotive force C E across the new working circuit can be derived by connecting such new working circuit between C and some point, as E, on the transformer-coil represented by the electromotive force A D. It is clear that this new electromotive force can be varied in phase and magnitude by moving its point of connection E along the line A D in either direction. The method of securing the phase relations between A C, C D, and A D is a well-known one.

F E represents the electromotive force necessary to send the current through the non-inductive resistance, and F C is the electromotive force or self-induction at right angles to F E. It will be noticed that F E, which may also represent the phase of the current, bears the same phase relation to A B that C E bears to A C. It is therefore seen that the relative phases of the currents in the working circuits described are determined by the relative phases of the electromotive forces across those working circuits.

If there is no self-induction in the circuit A C, it will assume the position A B at right angles to B D, and the relative phase angles and magnitudes then acquired by the different circuits are shown in Fig. 2. This condition would not be likely to exist, however, in any combination of circuits in which currents differing in phase would be used.

It being assumed in this figure that the working circuits A B and B E have no self-induction, the lines A B and B E truly represent the phase relations between those two working circuits both as to electromotive force and current.

The flow of a comparatively large amount of current in a derived circuit such as C E will cause a slight decrease in the angle C A D by the nearer approach of C to D. This can be corrected by increasing the inductance C D, or the phase relations between A C and C E can be retained by moving the point of connection E.

Fig. 3 shows the application of the principle to the operation of a two-phase motor. T is a transformer with secondary coil A D. M is a motor with its two circuits or sets of coils $x$ and $y$ joined at C and with their other terminals connected one to A and the other to E, and I an inductance-coil connected between C and D. The designating-letters being the same as in Fig. 1, the phase-angles can be readily traced.

In Fig. 4, M represents a three-phase motor with sets of coils $x$, $y$, and $z$. The coils $y$ and $z$ are joined at C, their other ends being connected to the transformer at A and E, respectively. The coil $x$ is connected between the transformer-terminals A and E, and the junction C is connected to the other transformer-terminal D through the inductance-coil I.

Fig. 5 shows graphically the phase-angles obtained in the arrangement illustrated in Fig. 4, the same designating-letters being employed as in the preceding figures.

Having fully described my invention, what I claim as new, and desire to secure by Letters Patent of the United States, is—

1. The method of obtaining difference in phase between two or more alternating-current branch circuits, which consists in connecting said branch circuits to different points in a single-phase supply-circuit and to each other, and shifting the phase of one of said branch circuits, whereby a slight phase difference induced in said branch circuit will cause currents to flow through the other of said branch circuits differing in phase from one another and from the supply-circuit.

2. The method of obtaining difference of phase between alternating-current circuits supplied from the same single-phase source, which consists in inducing between said source and a branch circuit derived therefrom a slight difference of phase by introducing self-induction into said branch circuit, and then connecting other derived branch circuits between other properly-selected points on said source and its said branch derived therefrom, whereby currents in the said derived branch circuits will be made to differ in phase from currents in said source, its said derived branch circuit and from one another, by angles of the required phase difference.

3. The method of obtaining difference of phase between two or more alternating-current-derived circuits, which consists in joining together one end of each of said circuits, connecting the common junction thus formed through suitable inductance or inductive resistance to a point in a main supply-circuit, and connecting the other ends of said circuits each to a different point in said supply-circuit, whereby the difference of potential between such points of connection will determine the desired phase difference between the said circuits.

4. The method of inducing in two or more circuits, a flow of alternating currents differing in phase from one another, which consists in attaching one end of each of said circuits each to a different point in a main supply-circuit, such points differing in potential from one another by a predetermined amount, joining the other ends of the said circuits together, and electrically connecting the common junction thus formed, through an inductance or inductive resistance, to another point in the main supply-circuit differing in potential from the points before selected.

5. In a system of electrical distribution, a single-phase source of alternating currents, a circuit derived therefrom having its phase slightly shifted and connected to the source at a given point, and one or more branches connected to suitable points in the said derived circuit and to points on the source differing in potential from each other and from the said given point of connection of the said derived circuit.

6. In a system of electrical distribution by alternating currents, a single-phase source, a circuit derived therefrom containing self-induction, other branch circuits connected between suitable points on the derived circuit and points on the source differing in potential from the point of junction of said source and its said derived circuit, 7. In a system of electrical distribution, a supply-circuit of alternating currents, circuits derived therefrom having one of the ends of each joined together and the other ends thereof each connected to a different point on said supply-circuit, and a circuit containing suitable inductive resistance connecting the common junction so formed to the supply-circuit at a point differing in potential from the said points of connection of said derived circuits.

8. In a system of electrical distribution, a supply-circuit of alternating currents, circuits derived therefrom having one end of each connected to a different point in said supply-circuit, said points differing in potential from one another by a predetermined amount, the other ends of said derived circuits being suitably joined, and a circuit containing suitable inductive resistance electrically connecting the junction so formed to another point in the supply-circuit differing in potential from the points before selected.

In testimony whereof I have hereunto set my hand and affixed my seal in the presence of the two subscribing witnesses.

HERBERT A. WAGNER. [L. S.]

Witnesses:
A. C. FOWLER,
JOHN F. GREEN.